United States Patent
Chen

(10) Patent No.: US 12,368,506 B2
(45) Date of Patent: Jul. 22, 2025

(54) PASSIVE OPTICAL NETWORK DEVICE FOR DETECTING ANOMALY AND METHOD THEREOF

(71) Applicant: Cortina Access, Inc., San Jose, CA (US)

(72) Inventor: Charles Chen, San Jose, CA (US)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 271 days.

(21) Appl. No.: 18/148,597

(22) Filed: Dec. 30, 2022

(65) Prior Publication Data
US 2024/0223272 A1 Jul. 4, 2024

(51) Int. Cl.
*H04B 10/03* (2013.01)
*H04B 10/077* (2013.01)

(52) U.S. Cl.
CPC .......... *H04B 10/03* (2013.01); *H04B 10/077* (2013.01)

(58) Field of Classification Search
None
See application file for complete search history.

(56) References Cited

U.S. PATENT DOCUMENTS

| | | | | |
|---|---|---|---|---|
| 5,285,305 A * | 2/1994 | Cohen | .................. | H04B 10/077 398/31 |
| 8,335,235 B2 * | 12/2012 | Davis | .................. | H04L 47/266 398/58 |
| 8,565,601 B2 * | 10/2013 | Nakura | ................ | H04B 10/272 398/140 |
| 8,687,960 B2 * | 4/2014 | Hirano | ................ | H04J 14/0238 398/58 |
| 8,768,163 B2 * | 7/2014 | Kim | .................... | H04Q 11/0067 398/33 |
| 8,842,990 B2 * | 9/2014 | Hood | ................. | H04Q 11/0067 398/67 |

(Continued)

FOREIGN PATENT DOCUMENTS

| | | |
|---|---|---|
| EP | 3576319 A1 | 12/2019 |
| EP | 3382920 B1 | 4/2020 |

(Continued)

OTHER PUBLICATIONS

Baig, Abubakar, Rogue ONT/ONU In FTTH/GPON, 2017 (Year: 2017).*

(Continued)

*Primary Examiner* — Jai M Lee
(74) *Attorney, Agent, or Firm* — McClure, Qualey & Rodack, LLP

(57) ABSTRACT

A passive optical network (PON) includes at least one optical network unit (ONU) at a downstream end and an optical line terminal (OLT) at an upstream end. Each ONU is dynamically allocated with an upstream communication window. During a laser always on (LAO) detection process, when the OLT receives an optical signal from the downstream end within an upstream idle window, the OLT determines that an LAO problem exists. The upstream idle window does not overlap with any upstream communication window. An anomaly detection method for the PON includes: during the LAO detection process, when the OLT receives an optical signal from the downstream end within the upstream idle window, determining, by the OLT, the LAO problem exists. An OLT includes an optical transceiver unit that optically communicates with the downstream end and output a receiving state signal and a control unit that determines whether the LAO problem exists.

15 Claims, 5 Drawing Sheets

(56) References Cited

U.S. PATENT DOCUMENTS

| | | | |
|---|---|---|---|
| 9,992,561 B2* | 6/2018 | Chen | H04L 63/1408 |
| 10,033,459 B2* | 7/2018 | Pitzer | H04B 10/272 |
| 2009/0245781 A1* | 10/2009 | Qi | H04J 3/1694 |
| | | | 398/1 |
| 2010/0067901 A1* | 3/2010 | Mizutani | H04B 10/272 |
| | | | 398/20 |
| 2010/0111523 A1 | 5/2010 | Hirth et al. | |
| 2012/0128357 A1* | 5/2012 | Mukai | H04B 10/27 |
| | | | 398/58 |
| 2019/0386743 A1 | 12/2019 | Yin et al. | |
| 2024/0196119 A1* | 6/2024 | Kim | H04L 1/0076 |

FOREIGN PATENT DOCUMENTS

| | | |
|---|---|---|
| TW | 201251350 A | 12/2012 |
| WO | 2010047950 A2 | 4/2010 |

OTHER PUBLICATIONS

IEEE Standard for Ethernet; "IEEE Standard for Information technology—Telecommunications and information exchange between systems—Local and metropolitan area networks—Specific requirements; Part 3: Carrier Sense Multiple Access with Collision Detection (CSMA/CD) Access Method and Physical Layer Specifications Amendment: Media Access Control Parameters, Physical Layers, and Management Parameters for Subscriber Access Networks;" IEEE 802.3; 2018; pp. 1-640.

IEEE Standard for Ethernet; "IEEE Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications;" 2009; pp. 1-236.

ITU-T G.984.1; Series G: Transmission Systems and Media, Digital Systems and Networks Digital sections and digital line system—Optical line systems for local and access networks; Gigabit-capable Passive Optical Networks; 2008; pp. 1-43.

ITU-T G.9807.1; "Series G: Transmission Systems and Media, Digital Systems and Networks Access networks—Optical line systems for local and access networks; 10-Gigabit-capable symmetric passive optical network (XGS-PON);" 2016; pp. 1-286.

* cited by examiner

PASSIVE OPTICAL NETWORK DEVICE FOR DETECTING ANOMALY AND METHOD THEREOF

BACKGROUND

Technical Field

The instant disclosure is related to a passive optical network. Especially, the instant disclosure is related to a passive optical network and an anomaly detection method regarding laser-always-on problem.

Related Art

Passive optical networks (PONs) have become a primary choice of broadband access to residential homes due to its major advantages of high bandwidth capacity, low interference, low latency, and low cost. A PON system comprises an optical line terminal (OLT) system in the central office and many optical network units (ONUs) located at the residential homes. The OLT system is connected to all ONUs using single fiber and one or more optical splitters. The downstream transmission from the OLT to the ONUs and the upstream transmission from the ONUs to the OLT are achieved using difference frequency bands.

Due to the directional properties of the optical splitter, the OLT can broadcast data to all ONUs in the downstream direction. This is an important property of the PON system, referred as single-channel broadcast (SCB) in the downstream. This property is particularly attractive to streaming applications such as television over internet protocols (or Internet Protocol television IPTV), where one television broadcast channel can be delivered to multiple subscribers/homes. In the upstream direction, however, each ONU can only communicate directly with the OLT system. Thus, in the downstream direction a PON may be viewed as a point-to-multipoint network, and, in the upstream direction, a PON may be viewed as a point-to-point network. It is important to note that the upstream bandwidth is time shared by all ONUs, and only one ONU can transmit data to the OLT at a time to avoid traffic collision. The OLT arbitrates which ONU can transmit data at a time and the duration of such transmission. This operation is known as dynamic bandwidth allocation (DBA).

An optical transceiver, which comprises a transmitter and a receiver, is required by the OLT system and the ONU to convert electronic signal to optical signal and vice versa. The optical transceiver of the ONU has the transmitter for the upstream transmission and the receiver for the downstream transmission. Only one ONU can transmit signals to the OLT system in the upstream at a time, and thus the transmitter of each ONU is required to operate in an on/off mode. The OLT system decides and informs which ONU can transmit signals at a given time and how long the ONU can transmit signals (i.e., the duration of the transmission). On the other hand, the transmitter of the ONU will be turned off during other times. The problem arises when a transmitter becomes faulty, which results in continuous transmission of optical signals. This problem is known as laser always on (LAO). The LAO problem will paralyze the entire PON system because no information from other ONUs can be received by the OLT system due to the LAO optical signal interference. The LAO problem can be considered as the noise on the optical fiber in the upstream direction. All ONUs will be deregistered from the OLT system because the communication in the upstream direction is broken. As a result, all the services will be disrupted.

SUMMARY

To address the above issue, one objective of the instant disclosure is to provide an online diagnosis and resolution mechanism and method which will not only detect and identify the faulty ONU transmitters but also restore the PON system automatically thereafter. This novel method can avoid traditional truck-roll method used to identify the faulty transmitters having the LAO problem; the truck-roll method requires technicians to drive all the way to the location of potentially faulty ONU transmitter with necessary equipment, and thus it is largely time-consuming and labor-demanding. Consequently, the invention of the instant disclosure saves time and labor, compared with traditional truck-roll method.

As of the application of the instant disclosure, there are two types of PONs defined by the standard bodies and deployed worldwide: Ethernet passive optical network (EPON) and gigabit-capable passive optical network (GPON) as well as its 10G or more variations. The invention disclosed in the instant disclosure is equally applicable to all PON types.

In some embodiments, a passive network comprises at least one optical network unit (ONU) at a downstream end and an optical line terminal (OLT) at an upstream end. Each of the at least one ONU is dynamically allocated with an upstream communication window. During a laser always on (LAO) detection process, when the OLT receives an optical signal from the downstream end within an upstream idle window, the OLT determines that an LAO problem exists. The upstream idle window does not overlap with the upstream communication window of any of the at least one ONU.

In some embodiments, an anomaly detection method for a passive optical network (PON) comprises: during a laser always on (LAO) detection process, when an optical line terminal (OLT) receives an optical signal from a downstream end within an upstream idle window, determining, by the OLT, that an LAO problem exists. The upstream idle window does not overlap with an upstream communication window of any ONU.

In some embodiments, an optical line terminal (OLT) comprises an optical transceiver unit and a control unit. The optical transceiver unit is configured to perform optical communication with a downstream end and, in response to receiving an optical signal from the downstream end, output a receiving state signal. The control unit is configured to, during a laser always on (LAO) detection process, when the receiving state signal is received within an upstream idle window, determine that an LAO problem exists. The upstream idle window does not overlap with an upstream communication window of the downstream end.

As above, the instant disclosure provides a diagnosis and resolution method applicable to conventional PON systems to deal with the LAO problem associated with optical transceivers. The design leverages the asymmetric property of the PON system, develops an algorithm and procedure to isolate and identify the faulty optical transmitters with the LAO problem, and then eventually removes the ONUs with the faulty optical transmitters from the operation to restore normal operation of the PON system.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
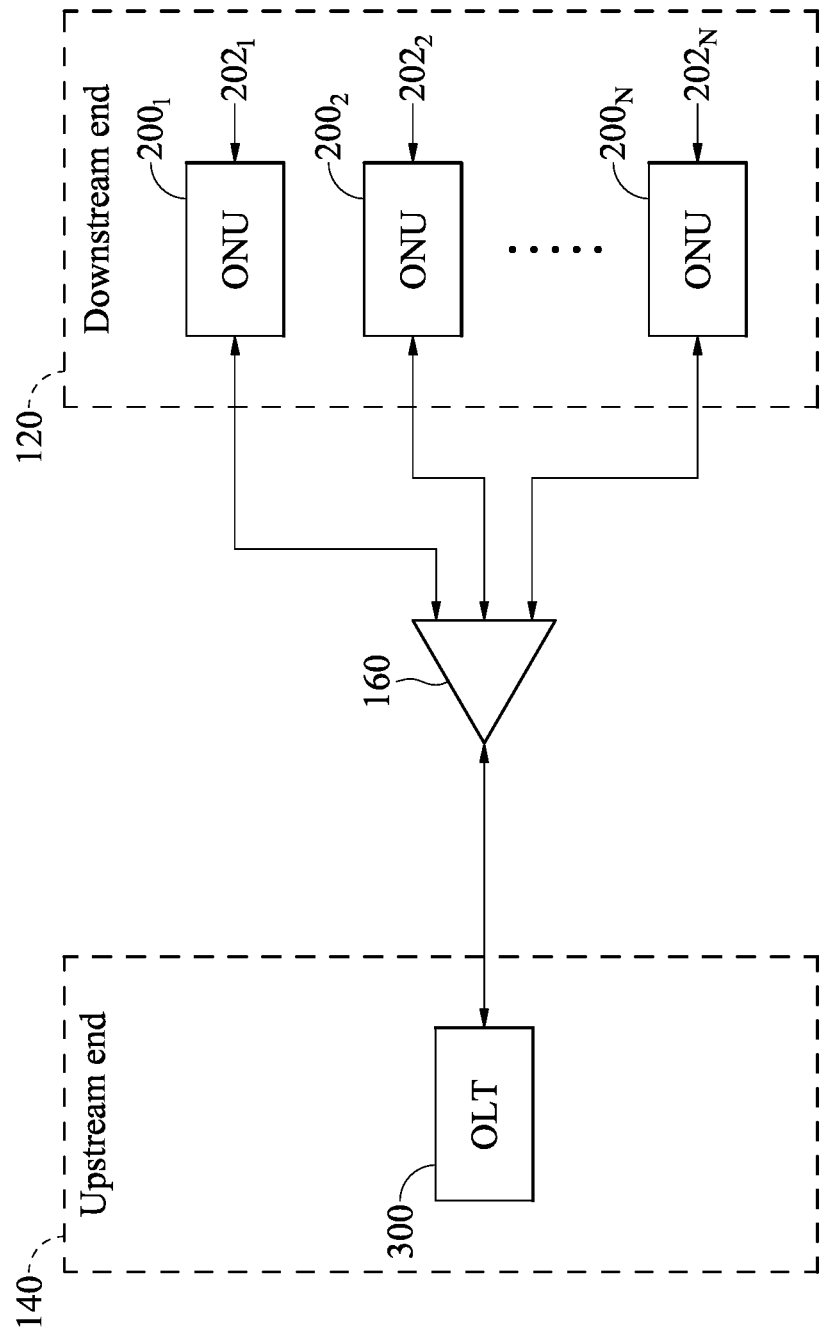
FIG. 1 illustrates a schematic diagram of a passive optical network system according to an exemplary embodiment of the instant disclosure.

The foregoing and other technical contents, features, and effects of the instant disclosure can be clearly presented below in detailed description with reference to embodiments of the accompanying drawings. Sizes of the elements in the drawings illustrated in an exaggerated, omitted, or general manner are used to help a person skilled in the art to understand and read, and the size of each element is not the completely actual size and is not intended to limit restraint conditions under which the instant disclosure can be implemented and therefore have no technical significance. Any modification to the structure, change to the proportional relationship, or adjustment on the size should fall within the scope of the technical content disclosed by the instant disclosure without affecting the effects and the objectives that can be achieved by the instant disclosure.

Figure 2:
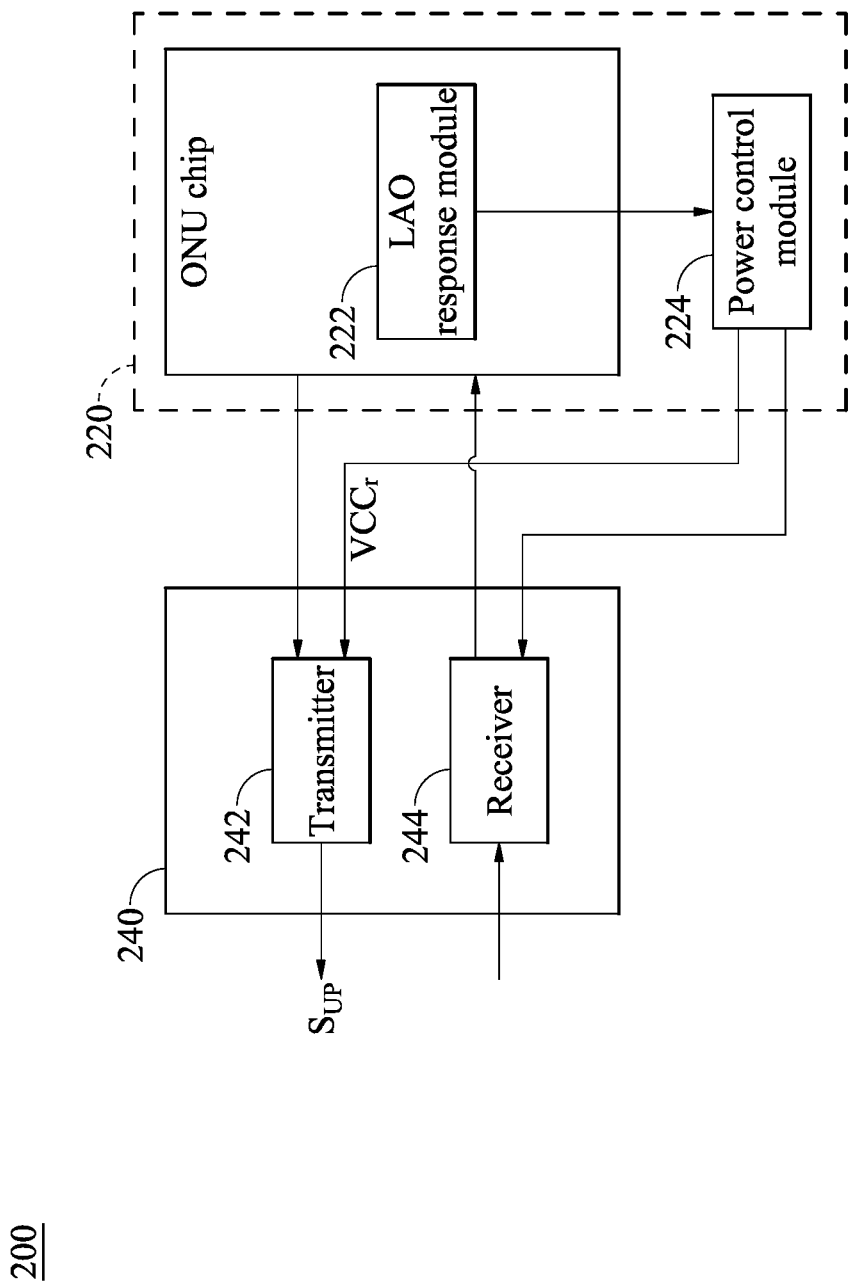
FIG. 2 illustrates a schematic block diagram of an optical network unit according to an exemplary embodiment of the instant disclosure.

Please refer to FIG. 1. FIG. 1 illustrates a schematic diagram of a passive optical network (PON) system 100 according to an exemplary embodiment of the instant disclosure. The PON system 100 comprises at least one optical network unit (ONU) at a downstream end 120 and an optical line terminal (OLT) 300 at an upstream end 140. In this exemplary embodiment, the number of ONUs is N, and N is an integer larger than 2. However, the number N may be any positive integer and thus is not limited to being larger than 2. Each of the ONUs $200_1$-$200_N$ is dynamically allocated with an upstream communication window $202_1$-$202_N$. During a laser always on (LAO) detection process, when the OLT 300 receives an optical signal $S_{UP}$ (as shown in FIG. 2) from the downstream end 120 (i.e., any of the ONUs $200_1$-$200_N$) within an upstream idle window, the OLT 300 determines that an LAO problem exists. The upstream idle window does not overlap with any of the upstream communication windows $202_1$-$202_N$ of the ONUs $200_1$-$200_N$. The optical communication between the downstream end 120 and the upstream end 140 is facilitated by a splitter 160.

Please refer to FIG. 1 and FIG. 2. FIG. 2 illustrates a schematic block diagram of an ONU according to an exemplary embodiment of the instant disclosure. Each of the ONUs $200_1$-$200_N$ comprises a control element 220 and an optical transceiver element 240. The optical transceiver element 240 comprises an optical transmitter 242 and an optical receiver 244 and can transmit the optical signal $S_{UP}$ to the OLT 300 and receive signals from the OLT 300. The control element 220 can control the power supply $VCC_T$ of the optical transmitter 242 so as to turn on or turn off the transmission function of the corresponding one of the ONUs $200_1$-$200_N$. The control element 220 comprises an LAO response module 222 and a power control module 224. The LAO response module 222 instructs the power control module 224 to cut off or not cut off the power supply $VCC_T$ of the optical transmitter 242. This process will be illustrated later. It is understood that, although the LAO response module 222 and the power control module 224 are respectively in and out of the ONU chip in the embodiment shown in FIG. 2, the LAO response module 222 may be implemented out of the ONU chip and the power control module 224 may be implemented in the ONU chip according to specific design goals, and thus the locations of the LAO response module 222 and the power control module 224 are not limited thereto. Alternatively, the LAO response module 222 and the power control module 224 may be integrated into a single module such as an integrated circuit (IC).

Figure 3:
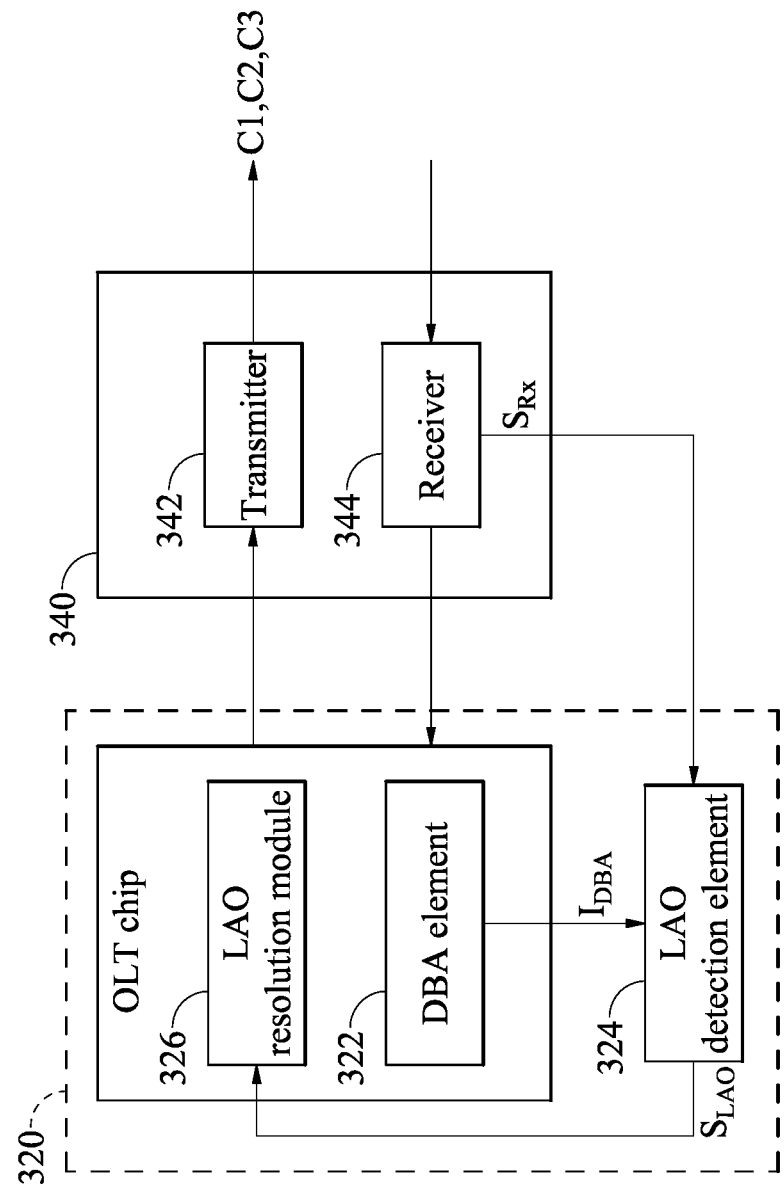
FIG. 3 illustrates a schematic block diagram of an optical line terminal according to an exemplary embodiment of the instant disclosure.

Please refer to FIG. 1 through FIG. 3. FIG. 3 illustrates a schematic block diagram of the OLT 300 according to an exemplary embodiment of the instant disclosure. The OLT 300 comprises a control unit 320 and an optical transceiver unit 340. The optical transceiver unit 340 comprises an optical transmitter 342 and an optical receiver 344 and can transmit control signals C1, C2, C3 to the ONUs $200_1$-$200_N$ and receive signals from the ONUs $200_1$-$200_N$. The control unit 320 is configured to perform an LAO detection process to determine whether the LAO problem exists. The control unit 320 is configured to further perform a debug process if the LAO problem exists (will be illustrated later). The control unit 320 comprises a dynamic bandwidth allocation (DBA) element 322, an LAO detection element 324, and an LAO resolution module 326. The DBA element 322 is used to decide which of the ONUs $200_1$-$200_N$ may transmit the optical signal $S_{UP}$ at a time by dynamically allocating each of the ONUs $200_1$-$200_N$ with an upstream communication window $202_1$-$202_N$. For example, as shown in FIG. 1, the ONU $200_1$ is assigned with the upstream communication window $202_1$, the ONU $200_2$ is assigned with the upstream communication window $202_2$, and so on, and each of the upstream communication windows $202_1$, $202_2$ ... $202_N$ does not overlap with one another. At least one upstream idle window is also assigned by the DBA element 322. During the at least one upstream idle window, none of the ONUs $200_1$-$200_N$ is allowed to transmit the optical signal $S_{UP}$ to the upstream end 140.

The LAO detection element 324 is configured to determine whether the LAO problem exists based on a DBA information $I_{DBA}$ from the DBA element 322 and a receiving state signal $S_{Rx}$ from the optical receiver 344. The DBA information $I_{DBA}$ comprises the information regarding the upstream communication windows $202_1$, $202_2$ ... $202_N$ and the at least one upstream idle window. The receiving state signal $S_{Rx}$ indicates whether the optical receiver 344 receives the optical signal $S_{UP}$ from the downstream end. For example, if the receiving state signal $S_{Rx}$ is high, the optical signal $S_{UP}$ is received, and if the receiving state signal $S_{Rx}$ is low, the optical signal $S_{UP}$ is not received, but the instant disclosure is not limited thereto. If the LAO detection element 324 determines that the LAO problem exists, the LAO detection element 324 outputs an LAO signal $S_{LAO}$ to the LAO resolution module 326 to initiate further troubleshooting (i.e., the debug process). This process will be illustrated later. It is understood that, although the DBA element 322 and the LAO resolution module 326 are in the OLT chip while the LAO detection element 324 is out of the OLT chip in the embodiment shown in FIG. 3, the DBA element 322, the LAO detection element 324, and the LAO resolution module 326 may each be implemented in or out of the OLT chip according to specific design goals, and thus the locations of the DBA element 322, the LAO detection element 324, and the LAO resolution module 326 are not limited thereto. Alternatively, the DBA element 322, the LAO detection element 324, and the LAO resolution module 326 may be integrated into a single module such as an IC.

Figure 4:
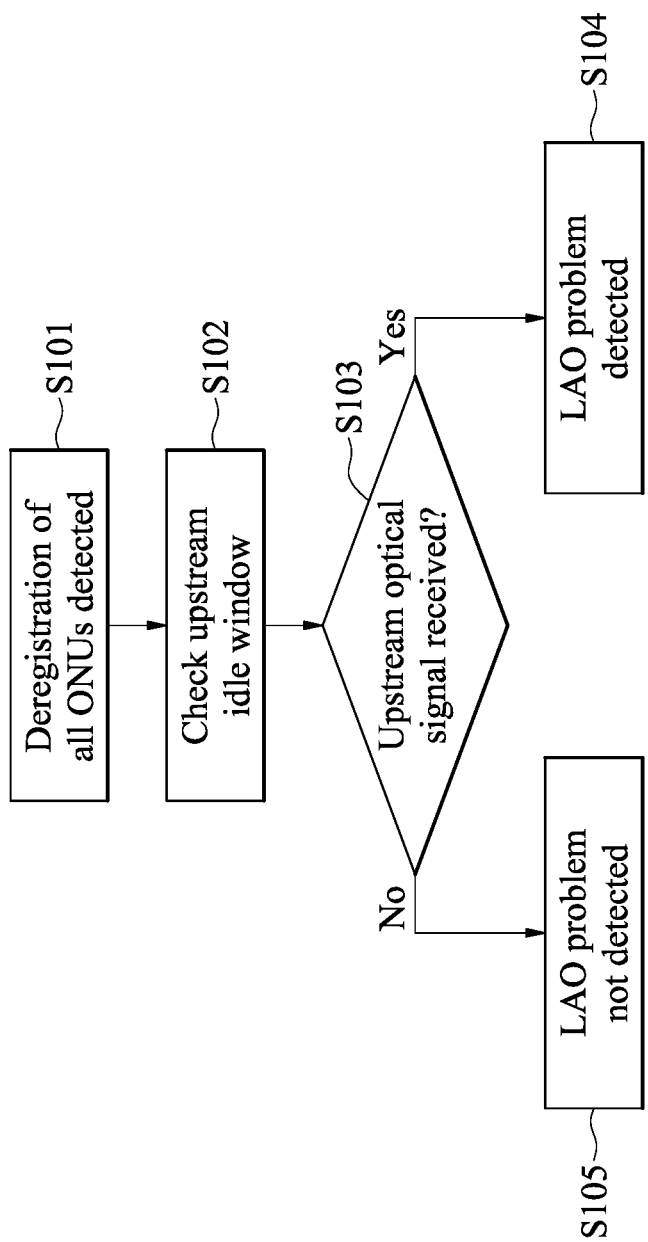
FIG. 4 illustrates a schematic flow chart of detection of laser-always-on problem according to an exemplary embodiment of the instant disclosure.

Please refer to FIG. 1 through FIG. 4. FIG. 4 illustrates a schematic flow chart of detection of the LAO problem according to an exemplary embodiment of the instant disclosure. In step S101, the OLT 300 detects deregistration of all of the ONUs $200_1$-$200_N$ and proceeds to step S102. In step S102, the LAO detection element 324 checks the upstream idle window based on the DBA information $I_{DBA}$ and proceeds to step S103 to perform the LAO detection process. In step S103, the LAO detection element determines whether the optical signal $S_{UP}$ from the downstream end 120 is received within the upstream idle window. If the optical signal $S_{UP}$ from the downstream end 120 is received within the upstream idle window, the LAO detection element 324 proceeds to step S104 to determine that the LAO problem exists and transmit the LAO signal $S_{LAO}$ to the LAO resolution module 326 to initiate further troubleshooting (i.e., the debug process). The debug process will be illustrated later. If the optical signal $S_{UP}$ from the downstream end 120 is not received within the upstream idle window or not received at all, the LAO detection element 324 proceeds to step S105 to determine that the LAO problem is not detected. In some embodiments, step S101 may be omitted, while step S102 and step S103 are continuously performed. In other words, in such embodiments, the OLT 300 does not detect whether the ONUs $200_1$-$200_N$ are deregistered; instead, the LAO detection element 324 continuously checks the upstream idle window based on the DBA information $I_{DBA}$ and determines whether an optical signal $S_{UP}$ from the downstream end 120 is received within an upstream idle window.

Figure 5:
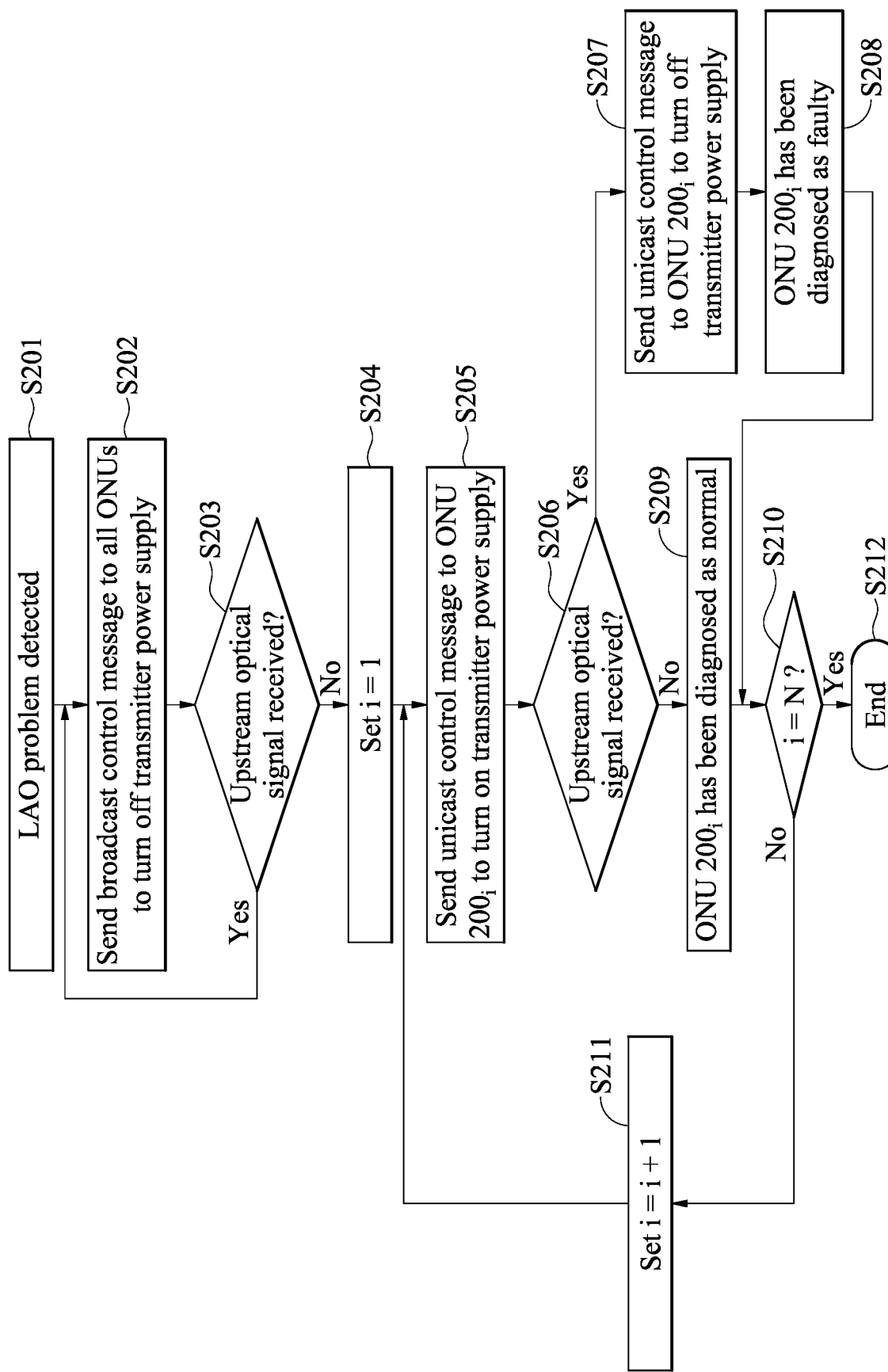
FIG. 5 illustrates a schematic flow chart of resolution of laser-always-on problem according to an exemplary embodiment of the instant disclosure.

Please refer to FIG. 1 through FIG. 5. FIG. 5 illustrates a schematic flow chart of resolution of the LAO problem according to an exemplary embodiment of the instant disclosure. In step S201, the LAO resolution module 326 receives the LAO signal $S_{LAO}$ from the LAO detection element 324 and proceeds to perform the debug process. The debug process comprises steps S202-S212. In step S202, the LAO resolution module 326 transmits a broadcast control message (i.e., the control signal C1) to the ONUs $200_1$-$200_N$, so that the transmission function of each of the ONUs $200_1$-$200_N$ is turned off. It is assumed that the receiver 244 of each of the ONUs $200_1$-$200_N$ is normal, and thus the ONUs $200_1$-$200_N$ can receive signals normally and operate accordingly except for the LAO problem. During this time, the LAO response module 222 of each of the ONUs $200_1$-$200_N$ receives the first control signal C1 and thus instructs the power control module 224 to cut off the power supply $VCC_T$ of the optical transmitter 242. Next, the LAO resolution module 326 proceeds to step S203 to determine if the optical signal $S_{UP}$ is still received. If the optical signal $S_{UP}$ is still received, step S202 may be repeated so as to attempt to turn cut off the power supply $VCC_T$ again. If the optical signal $S_{UP}$ continues to be received, there may be a maximum number of attempts before the LAO resolution module 326 determines that there is another problem besides the LAO problem and thus aborts the debug process. Alternatively, the LAO resolution module 326 may immediately determine that there is another problem besides the LAO problem when the optical signal $S_{UP}$ is received after the initial attempt and thus abort the debug process. If the optical signal $S_{UP}$ is no longer received during step S203, the LAO resolution module 326 proceeds to perform the anomaly detection process. The anomaly detection process comprises steps S204 to S212.

In step S204, the LAO resolution module 326 sets a variable i to 1. Next, in step S205, the LAO resolution module 326 transmits the unicast control message (i.e., the control signal C2) to the ONU $200_i$ so as to turn on the transmission function of the ONU $200_i$. Next, in step S206, the LAO detection process is performed on the ONU $200_i$ to determine whether the ONU $200_i$ starts incorrectly transmitting the optical signal $S_{UP}$ as soon as the transmission function is turned on. If the optical signal $S_{UP}$ is received, the LAO resolution module 326 proceeds to step S207 to transmit the unicast control message (i.e., the control signal C3) to the ONU $200_i$ to turn off the transmission function of the ONU $200_i$ and, in step S208, mark the ONU $200_i$ as faulty, although step S208 may be skipped. On the other hand, if the optical signal $S_{UP}$ is not received, the LAO resolution module 326 proceeds to step S209 to mark the ONU $200_i$ as normal, although this step may be skipped. Next, in step S210, the LAO resolution module 326 checks whether the ONU that has just completed being checked for anomaly is the last ONU (i.e., whether i=N). If i does not equal N, the LAO resolution module 326 then proceeds to step S211 to add 1 to i and then proceeds to step S205, i.e., to move on to the next ONU $200_{i+1}$ and repeat the same anomaly detection process. If i equals N, i.e., if all of the ONUs $200_1$-$200_N$ have been checked for anomaly, the LAO resolution module 326 proceeds to step S212 to end the anomaly detection process.

To sum up steps S204 to S212, the LAO resolution module checks the ONUs $200_1$-$200_N$ one by one for anomaly by turning on one of the transmitters of ONUs $200_1$-$200_N$ at a time to see if the optical signal $S_{UP}$ is received and then turns off the transmitters which transmit the optical signal $S_{UP}$ during this process. After the anomaly detection process, power supplies $VCC_T$ of all of the faulty ones of the ONUs $200_1$-$200_N$ has been turned off. As a result, the LAO problem is resolved, and the PON system 100 can resume operation without interference caused by constant optical signal $S_{UP}$ from the downstream end 120.

As above, the instant disclosure provides a diagnosis and resolution method applicable to conventional PON systems to deal with the LAO problem associated with optical transceivers. The design leverages the asymmetric property of the PON system, develops an algorithm and procedure to isolate and identify the faulty optical transmitters with the LAO problem, and then eventually removes the ONUs with the faulty optical transmitters from the operation to restore normal operation of the PON system.

What is claimed is:
1. A passive optical network (PON) comprising:
at least one optical network unit (ONU) at a downstream end, wherein each of the at least one ONU is allocated with an upstream communication window, wherein each ONU includes a first power supply for a laser transmitter and a second, separate power supply for a laser receiver, wherein a power control module associated with each ONU is configured to separately turn off the laser transmitter power supply during a debug process; and
an optical line terminal (OLT) at an upstream end, wherein, during a laser always on (LAO) detection process, when the OLT receives an optical signal from the downstream end within an upstream idle window, the OLT determines that an LAO problem exists, and the upstream idle window does not overlap with the upstream communication window of any of the at least one ONU.

2. The passive optical network according to claim 1, wherein, in response to deregistration of all of the at least one ONU, the OLT performs the LAO detection process.

3. The passive optical network according to claim 1, wherein the OLT comprises a control unit and an optical transceiver unit, the optical transceiver unit transmits a receiving state signal to the control unit, the receiving state signal indicates whether the optical signal transmitted by any of the at least one ONU is received, and the control unit determines whether the optical signal from the downstream end is received according to the receiving state signal.

4. The passive optical network according to claim 3, wherein the control unit comprises a dynamic bandwidth allocation (DBA) element and an LAO detection element, the LAO detection element obtains the upstream idle window according to a DBA information transmitted by the DBA element.

5. The passive optical network according to claim 1, wherein, after the OLT determines that the LAO problem exists, the OLT performs a debug process, and the debug process comprises: transmitting a first control signal to each of the at least one ONU, so that the transmission function of each of the at least one ONU is turned off.

6. The passive optical network according to claim 5, wherein each of the at least one ONU comprises a control element and an optical transceiver element, the optical transceiver element comprises an optical transmitter and an optical receiver, and the control element cuts off the power supply of the optical transmitter so as to turn off the transmission function.

7. The passive optical network according to claim 5, wherein the debug process further comprises:
performing an anomaly detection process on one of the at least one ONU, wherein the anomaly detection process comprises:
transmitting a second control signal to the ONU on which the anomaly detection process is currently performed, so as to turn on the transmission function of the ONU on which the anomaly detection process is currently performed; and
performing the LAO detection process;
wherein, during the LAO detection process, if the LAO problem is determined not to exist, the OLT continues performing the LAO detection process on one of the rest of the at least one ONU until all of the at least one ONU have gone through the anomaly detection process;
wherein, during the LAO detection process, if the LAO problem is determined to exist, the OLT transmits a third control signal to the ONU on which the anomaly detection process is currently performed, so as to turn off the transmission function of the ONU on which the anomaly detection process is currently performed.

8. The passive optical network according to claim 5, wherein each of the at least one ONU comprises a control element and an optical transceiver element, the optical transceiver element comprises an optical transmitter and an optical receiver, and the control element turns on or turns off the transmission function according to whether the power supply of the optical transmitter is cut off.

9. An anomaly detection method for a passive optical network (PON), wherein the PON comprises at least one optical network unit (ONU) at a downstream end and an optical line terminal (OLT) at an upstream end, and the method comprises:
during a laser always on (LAO) detection process, when the OLT receives an optical signal from the downstream end within an upstream idle window, determining, by the OLT, that an LAO problem exists, wherein the upstream idle window does not overlap with an upstream communication window of any of the at least one ONU;
after the OLT determines that the LAO problem exists, performing, by the OLT, a debug process, and the debug process comprises:
transmitting a first control signal to each of the at least one ONU, so that the transmission function of each of the at least one ONU is turned off; and
one by one, turning on a laser transmitter in the at least one ONU, with the error detection performed as each is turned on, to detect the faulty ONU.

10. The method according to claim 9, further comprising:
in response to deregistration of all of the at least one ONU, performing, by the OLT, the LAO detection process.

11. The method according to claim 9, wherein the debug process further comprises:
performing an anomaly detection process on one of the at least one ONU, wherein the anomaly detection process comprises:
transmitting a second control signal to the ONU on which the anomaly detection process is currently performed, so as to turn on the transmission function of the ONU on which the anomaly detection process is currently performed; and
performing the LAO detection process;
wherein, during the LAO detection process, if the LAO problem is determined not to exist, the OLT continues performing the LAO detection process on one of the rest of the at least one ONU until all of the at least one ONU have gone through the anomaly detection process;
wherein, during the LAO detection process, if the LAO problem is determined to exist, the OLT transmits a third control signal to the ONU on which the anomaly detection process is currently performed, so as to turn off the transmission function of the ONU on which the anomaly detection process is currently performed.

12. An optical line terminal (OLT), comprising:
an optical transceiver unit configured to perform optical communication with a downstream end and, in response to receiving an optical signal from the downstream end, output a receiving state signal; and
a control unit configured to, during a laser always on (LAO) detection process, when the receiving state signal is received within an upstream idle window, determine that an LAO problem exists, wherein the upstream idle window does not overlap with an upstream communication window of the downstream end;
wherein, after the control unit determines that the LAO problem exists, the control unit performs a debug process, and the debug process comprises: transmitting a first control signal to the downstream end, so that the transmission function of each of at least one optical network unit (ONU) of the downstream end is turned off, and wherein the transmission function of each of the at least one ONU is turn on, one by one, with an anomaly detection performed as each is turned on.

13. The optical line terminal according to claim 12, wherein, in response to deregistration of the downstream end, the control unit performs the LAO detection process.

14. The optical line terminal according to claim 12, wherein the control unit comprises a dynamic bandwidth allocation (DBA) element and an LAO detection element, the LAO detection element is configured to perform the LAO detection process and, according to a DBA information transmitted by the DBA element, obtain the upstream idle window.

15. The optical line terminal according to claim 12, wherein the debug process further comprises:
   performing the anomaly detection process on one of the at least one ONU, wherein the anomaly detection process comprises:
   transmitting a second control signal to the ONU on which the anomaly detection process is currently performed, so as to turn on the transmission function of the ONU on which the anomaly detection process is currently performed; and
   performing the LAO detection process;
   wherein, during the LAO detection process, if the LAO problem is determined not to exist, the OLT continues performing the LAO detection process on one of the rest of the at least one ONU until all of the at least one ONU have gone through the anomaly detection process;
   wherein, during the LAO detection process, if the LAO problem is determined to exist, the OLT transmits a third control signal to the ONU on which the anomaly detection process is currently performed, so as to turn off the transmission function of the ONU on which the anomaly detection process is currently performed.

\* \* \* \* \*